United States Patent [19]
Powell

[11] Patent Number: 5,065,704
[45] Date of Patent: Nov. 19, 1991

[54] INTERNAL COMBUSTION ENGINE AND KIT THEREFORE

[76] Inventor: Robert C. Powell, P.O. Box 894, Patagonia, Ariz. 85624

[21] Appl. No.: 614,858

[22] Filed: Nov. 16, 1990

[51] Int. Cl.$^5$ ............................................. F02M 25/04
[52] U.S. Cl. .................................. 123/25 J; 123/25 A; 261/18.2
[58] Field of Search ............... 123/25 J, 25 N, 25 E, 123/25 A, 25 K, 25 L, 25 M; 261/18.2

[56] References Cited

U.S. PATENT DOCUMENTS

| | | | |
|---|---|---|---|
| 1,097,380 | 5/1914 | Weglein, Jr. | 123/25 N |
| 1,582,239 | 4/1926 | Barbarou | 261/39.2 |
| 1,623,053 | 4/1927 | Howard et al. | 123/25 L |
| 1,627,951 | 5/1927 | Barbarou | 261/39.2 |
| 2,155,950 | 4/1939 | Nallinger | 261/39.2 |
| 2,513,775 | 7/1950 | Anderson | 123/25 N |
| 2,570,369 | 10/1951 | Murray | 261/119 |
| 3,021,123 | 2/1962 | Morton | 261/39.2 |
| 3,880,124 | 4/1975 | Stratton | 123/25 A |
| 3,991,724 | 11/1976 | Geiser | 123/25 A |
| 4,128,086 | 12/1978 | Garcea | |
| 4,306,519 | 12/1981 | Schoenhard | 123/25 R |
| 4,374,508 | 2/1983 | Pena | 123/25 E |
| 4,448,593 | 5/1984 | Spiers | 123/25 A |
| 4,557,222 | 12/1985 | Nelson | 123/25 B |
| 4,619,286 | 10/1986 | Caldwell | 137/81.1 |

FOREIGN PATENT DOCUMENTS

| | | | |
|---|---|---|---|
| 56-44438 | 4/1981 | Japan | 261/64.3 |
| 133598 | 10/1919 | United Kingdom | 123/25 A |

*Primary Examiner*—Andrew M. Dolinar
*Attorney, Agent, or Firm*—Mark E. Ogram

[57] ABSTRACT

An internal combustion engine in which a supply of adjustable water charged air is provided to the internal combustion engine. Water vapor is provided to the air stream through the use of an evaporative pad; this pad has an adjustable exposed surface area, thereby permitting the fine-tuning adjustment of the amount of humidity generated so as to maximize the efficiency of the engine. Additionally, a barometric valve adjusts the humid air stream and a heat-responsive valve provides additional air input depending on the altitude and ambient air temperature respectively.

20 Claims, 2 Drawing Sheets

INTERNAL COMBUSTION ENGINE AND KIT THEREFORE

BACKGROUND OF THE INVENTION

This invention relates generally to internal combustion engines and more particularly to devices used to increase the efficiency of internal combustion engines.

In 1890, the first compression-ignition engine was developed by Herbert Akroyd Stuart and was called the "hot bulb". This early engine was the first working model of the internal combustion engine which would come to be so vital to the industrial world.

Today, the internal combustion engine is the technology of choice when the need for energy arises. The internal combustion engine is used for transportation (cars, most propeller driven airplanes, boats, trains, etc.) as well as many stationary devices (electrical generators, welders, farm machinery, milling lifts, etc.).

The internal combustion engine is by far the major consumer of fossil fuels. Because of its large consumption of fossil fuels, efficiency of the engine becomes of supreme importance.

The largest focus on research into the internal combustion engine has been in the field of the carburetor which mixes, in predetermined fashion, the fuel with air. This mixture ratio and control is very important for the efficient "burning" of the fuel within the cylinders of the internal combustion engine.

Some of this research is reflected in U.S. Pat. No. 3,021,123, entitled "Carburetor and Means for Controlling the Same" issued Feb. 13, 1962, to Morton; U.S. Pat. No. 1,627,951, entitled "Control of Carburetors" issued May 10, 1927, to Barbarou; and, U.S. Pat. No. 1,582,239, entitled "Control of Carburetors for Internal Combustion Engines" issued Apr. 27, 1926, to Barbarou.

Recognizing that the air intake to the internal combustion engine is important, research has also be conducted on how to create a system which is sensitive to the altitude of the engine. As the altitude increases, the density of the air changes which affects the fuel/air ratio. A carburetor with a fixed adjustment, loses its optimal affect as the air thins due to altitude changes; altitude adjustment is a paramount concern for aircraft.

Some patents addressing this problem are: U.S. Pat. No. 4,128,086, entitled "Automatic Device for Controlling the Pressure of the Intake Air of an I.C. Engine as its Operating Altitude Varies" issued Dec. 5, 1978, to Garcea; Japanese Patent number 56-44438, entitled "Air-Fuel Ratio Control System with High Altitude" issued Apr. 23, 1981, to Seiki; U.S. Pat. No. 4,619,286, entitled "Elevation Responsive Automatic Vehicle Control System" issued Oct. 28, 1986, to Caldwell; and U.S. Pat. No. 2,155,950, entitled "Controlling Apparatus for an Internal Combustion Engine" issued Apr. 25, 1939, to Nallinger. All of these patents are incorporated hereinto by reference.

One very intriguing area of research which has been explored for the enhancement of the fuel efficiency in internal combustion engines, is the concept of providing a humid air flow to the carburetor. Some of these devices are described in U.S. Pat. No. 2,570,369, entitled "Humidifier for Internal-Combustion Engines" issued Oct. 9, 1951, to Murray; U.S. Pat. No. 3,880,124, entitled "Air Filter and Humidifier" issued Apr. 29, 1975, to Stratton; U.S. Pat. No. 4,306,519, entitled "Air Humidity Device for Internal Combustion Engine" issued Dec. 22, 1981, to Schoenhard; and, U.S. Pat. No. 4,557,222, entitled "Forced Humid Aspiration for Internal Combustion Engines" issued Dec. 10, 1985, to Nelson. All of these patents are incorporated hereinto by reference.

In each of the humid air systems, the enhancement to the fuel efficiency is merely 10-20%. This low level of improvement does not justify the capital expenses and operating costs associated with these type of devices; hence, this technology has not been capitalized upon.

It is clear that improvements to the efficiency of an internal combustion engine are extremely important.

SUMMARY OF THE INVENTION

In the present invention, an internal combustion engine is supplied an airstream of adjustable water charged air. Water vapor is provided to the air stream into the engine through the use of an evaporative pad; this pad is adjustable as to the exposed surface area, thereby permitting its fine-tuning to maximize the efficiency of the engine. Additionally, a barometric valve adjusts the humid air supply and a heat-responsive valve provides additional air input depending on the altitude and ambient air temperature respectively.

The present invention is embodied either as a complete internal combustion engine or as a retrofit kit for existing internal combustion engines. In this manner, both older engines and new models are able to capitalize upon the advantages and efficiency of the present invention.

Although the present discussion relates generally to gasoline engines and specifically to gasoline driven vehicles, those of ordinary skill in the art readily recognize that the invention is equally applicable to all internal combustion engines.

The present invention recognizes that the use of water vapor must be delicately controlled and not merely inserted without regard. Control of the amount of water vapor is primarily obtained by adjustment of the surface area of the evaporative pad. This adjustment is done in the preferred embodiment through mechanical movement, during normal tune-up of the engine, of the evaporative pad to increase/decrease its exposed surface area.

A more enhanced embodiment of the invention utilizes a real time adjustment mechanism that senses the humidity in the air stream going to the engine and adjusts the surface area to keep this humidity level within a prescribed optimal zone.

Further enhancements to the engine provide for a barometric valve which adjusts the humid air stream based upon the altitude of the engine. As the altitude increases, the opening permitting the humid air to flow is increased to adjust for the engine's new demands; similarly, as the altitude decrease, the humid air flow is restricted.

Still another enhancement of the present invention is the provision for added air flow to the carburetor based upon the ambient heat. It is well known that as the ambient temperature rises, the relative density of the surrounding air decreases. The same volume of air that is optimal for an internal combustion engine at sixty degrees fahrenheit is sub-optimal when the ambient temperature reaches one hundred degrees or more.

The present invention provides for a second input port or orifice into the air filter which is opened as the ambient temperature rises and which is restricted as the ambient air temperature decreases. In experiments, a suitable valve for this purpose is a simple mechanical valve commonly used on chicken brooder machines.

The invention, as a retrofit kit, is easy to install. The kit fundamentally replaces the air filter housing with a replacement air filter housing. The replacement housing has a primary port or inlet which communicates with the humidifing device. The humidifying devices utilizes a circulating pump to circulate water from a reservoir over the evaporative pad. A barometric sensitive valve is placed in the line between the replacement air filter and the humidifier to control the flow of humid air to the engine.

A second valve, being sensitive to heat, adjusts a second port or inlet to the replacement air filter housing.

Installation of the apparatus, when acquired in kit form, is easily accomplished, thereby reducing the start-up costs and further induces the use of the technology.

Although the present discussion relates to a motor-vehicle, those of ordinary skill in the art readily recognize that the present invention is also useful for stationary internal combustion engines and in fact is useful for all internal combustion engines whether the engine uses gasoline, diesel, kerosene, or any other combustable fuel.

Testing with the present invention, when properly adjusted and using the valves as outlined, has increased a test vehicle's mileage from an average of nine miles per gallon to over twenty miles per gallon. This doubling of the fuel efficiency, especially in the modern age of expensive fossil fuels, more then justifies the costs and inconvenience of the device.

These testing with the test vehicle has shown that an increased volume of air is required for the engine to maximize its efficiency.

The reason for the improved efficiency from the water vapor is not completely understood. One theory is that the water vapor in the airstream is converted to steam inside the hot cylinders and provides additional force upon the cylinder; thereby capitalizing upon heat which otherwise would have to be exhausted through the cooling system.

Another theory is that during the evaporation process, a certain amount of the water is changed into its component gaseous parts of oxygen and hydrogen. This free gas oxygen and hydrogen are then recombined within the cylinder during ignition to release energy and provide additional pressure upon the cylinder.

One important point which has surfaced in the testing is the requirement to use extremely pure water. The above tests were all conducted using rain water; but, it is felt that distilled water has the same affect. Impurities in the water have significant negative impact upon the efficiency of the engine.

The invention, together with various embodiments thereof will be more fully explained by the following drawings and their accompanying descriptions.

DRAWINGS IN BRIEF

DRAWINGS IN DETAIL

Figure 1:
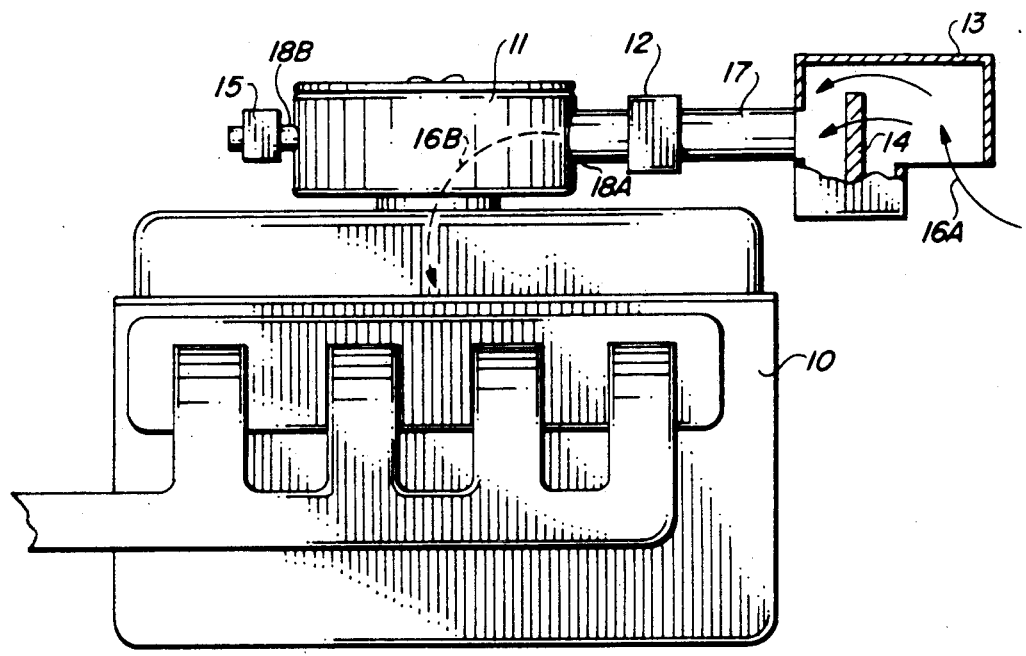
FIG. 1 is a block diagram of an embodiment of the invention.

FIG. 1 is a block diagram of the preferred embodiment of the invention. Internal combustion engine 10 is supplied a mixture of fuel and air for proper combustion and energy withdrawal.

Air filter 11 has been modified to incorporate both a primary port 18A and a secondary port or orifice 18B. Port 18A eventually communicates with humidifier 13 for supplying a humid air flow as indicated by arrow 16B.

Humidifier 13 has an evaporative pad 14, over which water is pumped (not shown). Evaporative pad 14 is positioned to be in the air flow going to internal combustion engine 10 as indicated by arrow 16A. As shown, evaporative pad 14 is positioned to permit a predetermined amount of air flow 16A to pass through evaporative pad 14 and some of air flow 16A to bypass evaporative pad 14. In this manner, the amount of humidity added to the air flow is regulated.

The now humid air flow travels through duct 17 and through barometric valve 12. Barometric valve 12 provides further control over the humid air flow and adjusts the humid air flow based upon the altitude of engine 10.

After barometric valve 12, the air flow enters air filter 11 and then passes into the internal combustion engine 10 as shown by arrow 16B. Internal combustion engine 10 utilizes this air flow as a typical internal combustion engine would.

Another adjustment done to this embodiment of the invention is through the use of heat-activated valve 15 which communicates with air filter 11 via port 18B. Heat-activated valve 15 restricts a supplemental air flow into air filter 11 when the ambient air temperature falls; conversely, the supplemental air flow is increased by heat-activated valve 15 when the ambient air temperature rises. In this manner, non-humid air is added to the internal combustion engine to assure proper combustion of the fuel.

Figure 2:
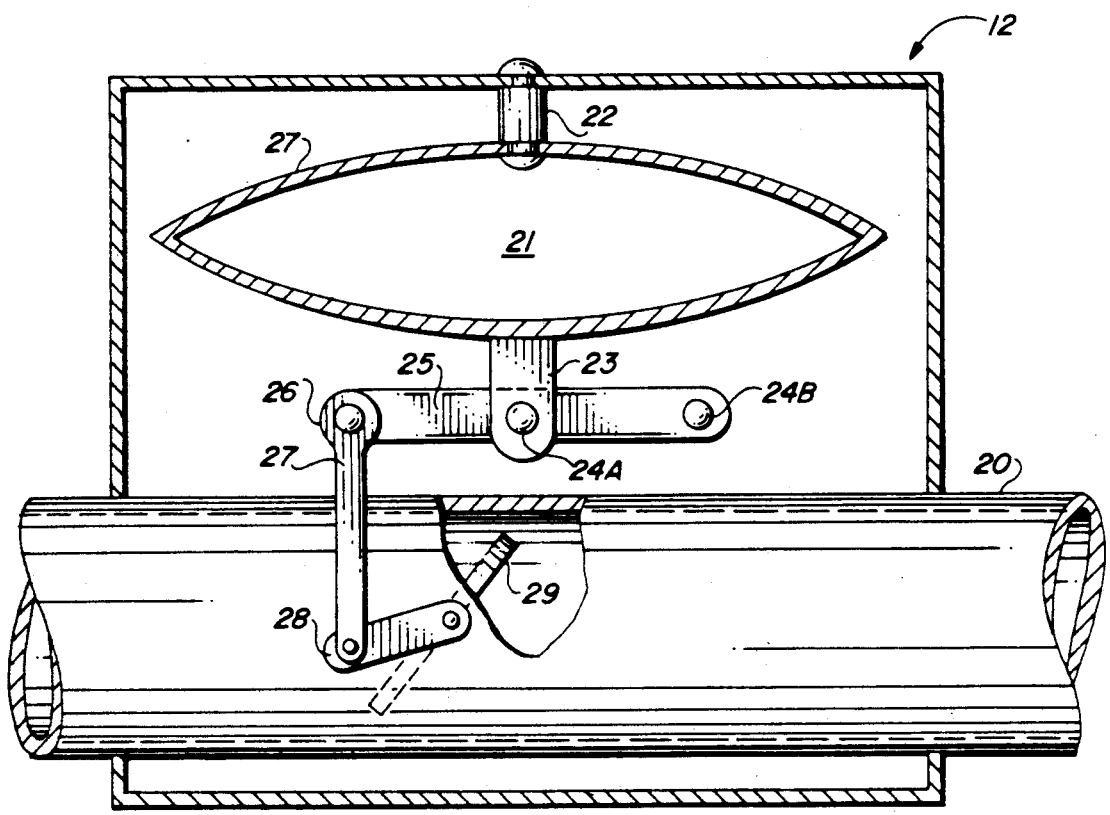
FIG. 2 is a cutaway view of the preferred embodiment of the barometric valve as used by the invention.

FIG. 2 is a cutaway view of the barometric valve first described in FIG. 1. This embodiment of the barometric valve 12 has an outer casing 27 which seals an inner envelope 21. Inner envelope 21 is partially evacuated. One side of barometric valve 12 is fixed in position by pin 22 while the other side is allowed to expand or contract, based upon the atmospheric pressure, upon pin 23.

Pin 23 engages swivel arm 25 at pin 24A which is movable. Pin 24B is fixed, creating a lever action at end 26 which is used to modulate a butterfly valve in the duct work (not shown).

Movement of arm 25 lifts or lowers connecting rod 27 which similarly moves lever 28. Lever 28 opens or closes butterfly valve 29 located within the duct or pipe 20.

In this manner, the airflow from the humidifier described in FIG. 1 is automatically adjusted to meet changes in altitude.

Those of ordinary skill in the art readily recognize various other barometric valves which operate and accomplish the objective of the present embodiment.

Figure 3A:
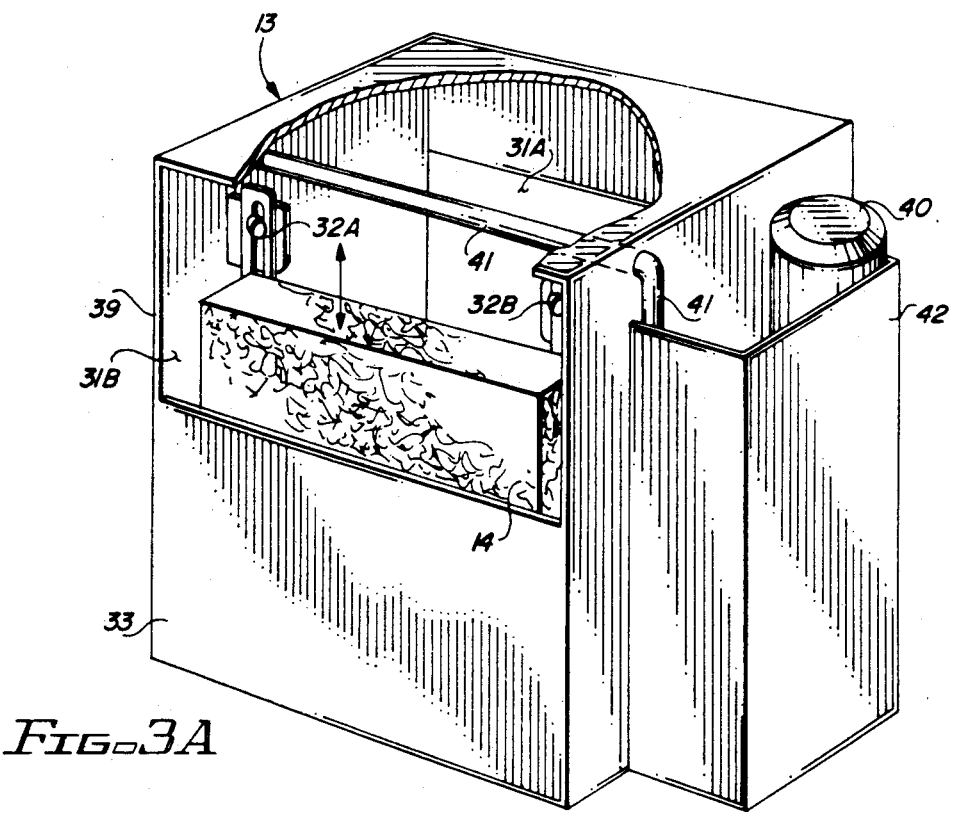
FIGS. 3a and 3b are cutaway views of two embodiments of the humidifier of the present invention.
Figure 3B:
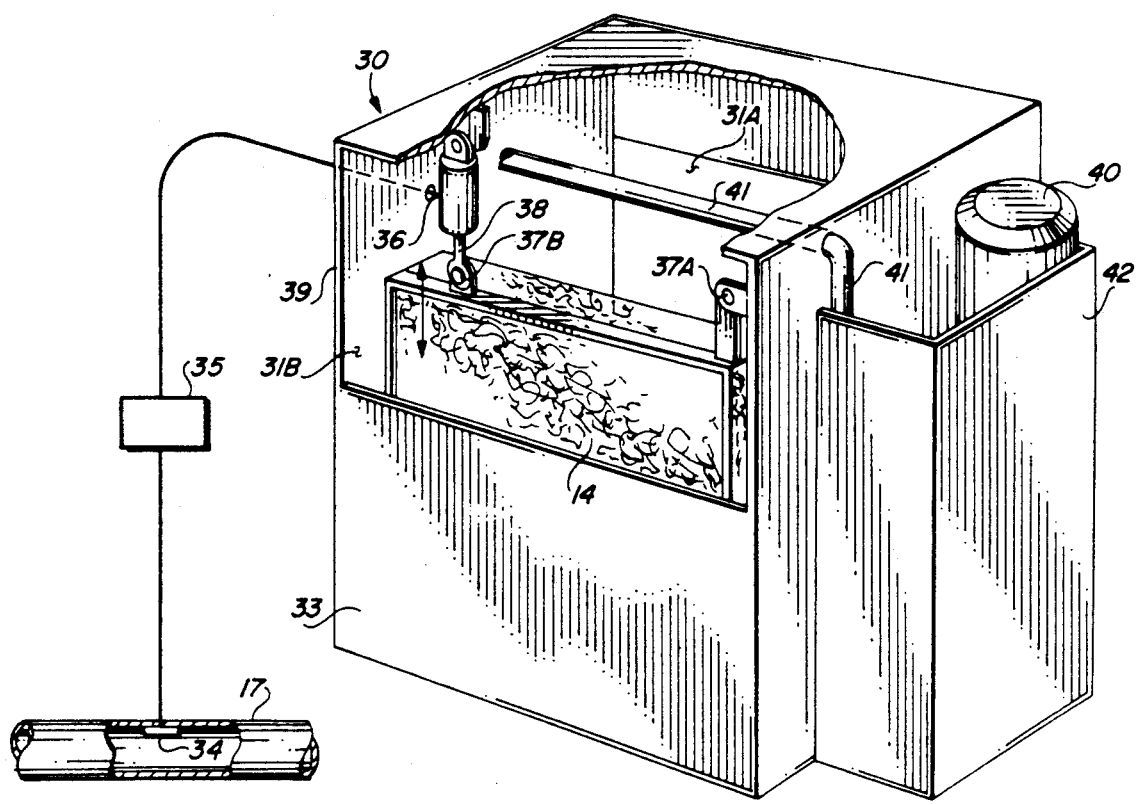

FIGS. 3A and 3B are alternative embodiments of the humidifier first described in relation to FIG. 1.

FIG. 3A is the preferred embodiment of the humidifier 13 and has an outer casing 39 enclosing the evaporative pad 14. Through the use of set screws 32A and 32B, in tuning the engine, the operator is able to move evaporative pad 14 so as to expose more of window 31A, or cover window 31B and thereby increase the humidifying affect.

Note that a portion of evaporative pad 14 is in water reservoir 33. Although this is the preferred embodiment, it is also possible to position the evaporative pad completely out of the reservoir.

Pump 40 draws water from reservoir 33 into basin 42. The pumped water is either misted or dropped by pipe 41 onto evaporative pad 14. In this manner, the excess water is collected and recirculated. A separate reservoir, not shown, maintains a supply of fresh water to humidifier 13.

FIG. 3B illustrates an alternative embodiment of the humidifier in which control of the exposure of window 31A and covering of window 31B is accomplished automatically and is based upon the humidity content of the air flow to the internal combustion engine.

Probe 34 is positioned in duct 17 to sense the humidity of the air flow to the internal combustion engine (not shown). Based upon signals from probe 34, controller 35 adjusts ram 36 to raise or lower shank 38.

Shank 38 is attached to wing 37B of the evaporative pad 14. Wing 37A is fixed in position permitting the movement of wing 37B by shank 38 to selective reveal or cover the window (as illustrated as 31A and 31B respectively).

In this manner, the humidifier automatically adjusts the humidity within the airstream going to the internal combustion engine and thereby maintains the internal combustion engine operation as maximal.

Because the present invention permits the optimal operation of an internal combustion engine, estimated to practically double the mileage, the amount of pollution due to operation of the engine is halved; water vapor is not a pollutant.

It is clear from the foregoing that the present invention provides for an improved internal combustion engine whether the device is installed at the factory or as a retrofit kit.

What is claimed is:

1. An engine assembly comprising:
   a) an internal combustion engine in which fuel is burned in air;
   b) an air filter having a primary port for directing a supply of air to said internal combustion engine; and,
   c) an adjustable humidifier having,
      1) an evaporative pad, a portion of the surface of said evaporative pad located in an air stream to said air filter,
      2) adjustment means for selectively increasing or decreasing the surface area of said evaporative pad exposed to said air stream,
      3) a reservoir for storage of purified liquid water, and,
      4) a water pump for recirculating purified liquid water from said reservoir over said evaporative pad.

2. The engine assembly according to claim 1 wherein said adjustment means is automatically responsive to the humidity level of said air stream.

3. The engine assembly according to claim 1 wherein said adjustment means includes an affixable mount for selective movement of said evaporative pad during tuning of said internal combustion engine.

4. The engine assembly according to claim 1 further comprising a barometric valve for automatic adjustment of said air stream from said humidifier to said air filter based upon altitude of said internal combustion engine.

5. The engine assembly according to claim 4 further comprising:
   a) a secondary port in said air filter; and,
   b) a heat-activated valve for automatically adjusting said secondary port based upon ambient temperature.

6. An internal combustion engine system comprising:
   a) an internal combustion engine in which fuel is burned in air;
   b) an air filter having a primary port for directing a supply of air to said internal combustion engine; and,
   c) an adjustable humidifier for providing a selective amount of water vapor to said air filter, the humidifier having,
      1) an evaporative pad, a portion of the surface of said evaporative pad located in an air stream to said air filter, and,
      2) adjustment means for selectively increasing or decreasing the surface area of said evaporative pad exposed to said air stream.

7. The internal combustion engine system according to claim 6 wherein said adjustment means is responsive to the humidity level of said air stream.

8. The internal combustion engine system according to claim 6 wherein said adjustment means includes an affixable mount for selective movement of said evaporative pad during tuning of said internal combustion engine.

9. The internal combustion engine system according to claim 6 further comprising a barometric valve for automatic adjustment of said air stream from said humidifier to said air filter based upon altitude of said internal combustion engine.

10. The internal combustion engine system according to claim 9 further comprising:
    a) a secondary port in said air filter; and,
    b) a heat-activated valve for automatically adjusting the secondary port based upon ambient temperature.

11. The internal combustion engine system according to claim 10 further comprising a water reservoir and wherein said water reservoir supplies fresh water to said humidifier.

12. The internal combustion engine system according to claim 11 wherein said humidifier includes a water pump and wherein said pump recirculates water over said evaporative pad.

13. A kit for an internal combustion engine having an original air filter, the kit comprising:
    a) a replacement air filter being mountable to said internal combustion engine in lieu of the original air filter and having a primary port for directing a supply of air to said internal combustion engine; and,
    b) an adjustable humidifier having,
       1) an evaporative pad, a portion of the surface of said evaporative pad located in an air stream to the primary port of said replacement air filter,
       2) adjustment means for selectively increasing or decreasing the surface area of said evaporative pad exposed to said air stream,
       3) a reservoir for storage of purified liquid water, and, 4) a water pump for recirculating purified liquid water over said evaporative pad.

14. The kit according to claim 13 further including means for automatically adjusting the adjustment means based upon the humidity level of said air stream.

15. The kit according to claim 13 wherein said humidifier includes an affixable mount for selective movement of said evaporative pad during tuning of said internal combustion engine.

16. The kit according to claim 13 further including a barometric valve for automatic adjustment of said air stream from said humidifier to said air filter based upon altitude of said internal combustion engine.

17. The kit according to claim 16 wherein said replacement air filter includes a secondary port, and further including a heat-activated valve for automatically adjusting said secondary port based upon ambient temperature.

18. A kit for an internal combustion engine having an original air filter, the kit comprising:
   a) a replacement air filter being mountable to said internal combustion engine in lieu of said original air filter and having a primary and a secondary port for directing a supply of air to said internal combustion engine; and,
   b) an adjustable humidifier having,
      1) an evaporative pad, a portion of the surface of said evaporative pad located in an air stream to the primary port of said replacement air filter,
      2) adjustment means for selectively increasing or decreasing the surface area of said evaporative pad exposed to said air stream,
      3) a reservoir for storage of purified liquid water, and,
      4) a water pump for recirculating purified liquid water over said evaporative pad;
   c) a barometric valve for automatic adjustment of said air stream from said humidifier to said air filter based upon altitude of said internal combustion engine; and,
   d) a heat-activated valve for automatically adjusting said secondary port based upon ambient temperature.

19. The kit according to claim 18 further including means for automatically adjusting the humidity level of said air stream.

20. The kit according to claim 18 wherein said humidifier includes an affixable mount for selective movement of said evaporative pad during tuning of said internal combustion engine.

* * * * *